July 27, 1965     J. L. FULLER     3,196,973

SPEED CONTROL MECHANISM

Original Filed Oct. 2, 1961     5 Sheets-Sheet 1

INVENTOR.
JOHN L. FULLER

BY *Alfred C. Body*

ATTORNEY

July 27, 1965     J. L. FULLER     3,196,973

SPEED CONTROL MECHANISM

Original Filed Oct. 2, 1961     5 Sheets-Sheet 2

*INVENTOR.*
JOHN L. FULLER

BY

ATTORNEY

July 27, 1965

J. L. FULLER 3,196,973

SPEED CONTROL MECHANISM

Original Filed Oct. 2, 1961

INVENTOR.
JOHN L. FULLER
BY

ATTORNEY

July 27, 1965     J. L. FULLER     3,196,973
SPEED CONTROL MECHANISM
Original Filed Oct. 2, 1961     5 Sheets-Sheet 5

INVENTOR.
JOHN L. FULLER
BY

ATTORNEY

United States Patent Office 3,196,973
Patented July 27, 1965

3,196,973
SPEED CONTROL MECHANISM
John L. Fuller, 802 St. Clair Ave., Shaker Heights, Ohio
Continuation of application Ser. No. 142,265, Oct. 2, 1961. This application May 4, 1964, Ser. No. 365,855
15 Claims. (Cl. 180—82.1)

This invention pertains to the art of speed governors, and more particularly to a speed governor for variable speed power sources.

This application is a continuation application of my copending application Serial No. 142,265, filed October 2, 1961, and now forfeited.

The invention is particularly applicable to governing of the speed of a motor vehicle and will be described with particular reference thereto, although it will be appreciated that the invention has broader applications and may be used to govern speed of any type of rotating power sources such as Diesel or gasoline engines, either fixed or movable, and variable speed electric motors.

In the art of governing the speed of motor vehicles, it has been known to provide a servo-motor which opens and closes the throttle setting of the engine and to power this servo-motor with the vacuum of the manifold through a speed sensitive valve or pressure modulator. Such valves normally comprise a rotating member which changes position in response to centrifugal force. This change in position is then translated to the valve itself. In all of such prior installations, difficulty has existed in obtaining satisfatcory operation because of the inherent friction between the various parts of the valves as they move under the effects of the centrifugal force. This has resulted in either erratic operation or in hunting as the governor seeks to control the speed of the vehicle to a preset speed.

It has heretofore been proposed to provide a pressure modulating valve having a valve member which moves in friction-free relationship to a spaced member, but difficulty has been experienced with such arrangements because variations in the manifold pressure resulted in a variable force on the member in addition to the centrifugal force which results in erratic and unsatisfactory performance. Various means have been provided to compensate for this effect, but heretofore these means have been unsuccessful.

Another problem with speed governors for motor vehicles has been that of deactivating the control of the governor when the vehicle is stopped or when the speed of the vehicle is substantially different from that of the set speed of the governor. Thus, if the set speed of the governor were 60 miles per hour, or even 10 miles per hour, and the vehicle engine was initially started with the vehicle at rest and the engine disengaged from the rear wheels, the governor would immediately indicate a need for maximum power from the engine which could result in a destructive overspeeding of the engine.

The present invention contemplates an improved speed control pressure modulating valve which overcomes all of the above-referred to difficulties and others and provides a valve arrangement which is simple in construction, economical to manufacture, and which gives a highly improved performance characteristic.

In accordance with the present invention, a speed sensitive valve is provided of a base member and a rotatable valve member, each having ported surfaces substantially perpendicular to the axis of rotation and in close but spaced relationship, the valve member having a center of gravity offset from the axis of rotation and being biased toward the axis, whereby as it rotates, it is radially displaced from the axis of rotation to move the ports into and out of alignment. One of the ports leads to a pressure source and the other port leads to the servo-motor such that relative alignment of these ports controls the pressure in the servo-motor.

Further in accordance with the present invention, means are provided for venting the servo-motor to atmosphere when the vehicle is at rest or when the vehicle is moving at a speed substantially different from the set speed of the governor to thereby deactivate the servo-motor.

Further in accordance with the invention, the valve member is supported for rotation and radial displacement on the end of a swingable non-extensible arm, which arm extends generally parallel to the axis of rotation. With this arrangement, a variable vacuum or a pressure in the control system does not create a variable radial force on the valve member in addition to the centrifugal force thereon.

Further in accordance with the invention, the surface of the base member has a pair of spaced ports, one communicated to the pressure source and the other communicated with the servo-motor and the rotatable and axially displaceable valve member has a port in its surface to control the amount of communication between the two ports in the surface of the base member.

The primary object of this invention is to provide a speed control mechanism wherein a novel speed responsive pressure modulator has a friction-free valving arrangement.

Another object of this invention is to provide such a speed control mechanism to control the engine of a motor vehicle that is to travel at a substantially constant, desired speed regardless of variations in forces opposing such constant speed travel.

Another object of this invention is to provide a speed control mechanism which may be conveniently and readily attached to all types of adjustable speed power sources for regulating the power control means of the power source to thereby maintain a predetermined, adjustable and constant speed of operation.

Another object of this invention is to provide a speed responsive pressure modulating valve for controlling the speed of a power source which is not activated until the speed of the power source is close to, but below, the set speed of the valve.

A still further object of this invention is to provide a friction-free pressure modulating valve for controlling the speed of a power source such as an internal combustion engine of a motor vehicle wherein the pressure of the control fluid is exerted substantially perpendicularly to the movement of the valve members to thereby eliminate the effect of variations in the pressure of the control fluid on the operation of the friction-free valve.

Still a further object of this invention is to provide a friction-free valve for modulating the pressure of a fluid which controls a throttle valve of an internal combustion engine through the use of two relatively movable valve members, one being radially fixed and having a control port and the other being rotatable, radially movable and having a control port which moves into and out of alignment with the other to thereby modulate the pressure of the control fluid.

These and other objects and advantages will become apparent from the following description used in illustrating the preferred embodiment of the invention as read in connection with the accompanying drawings in which.

Figure 1:
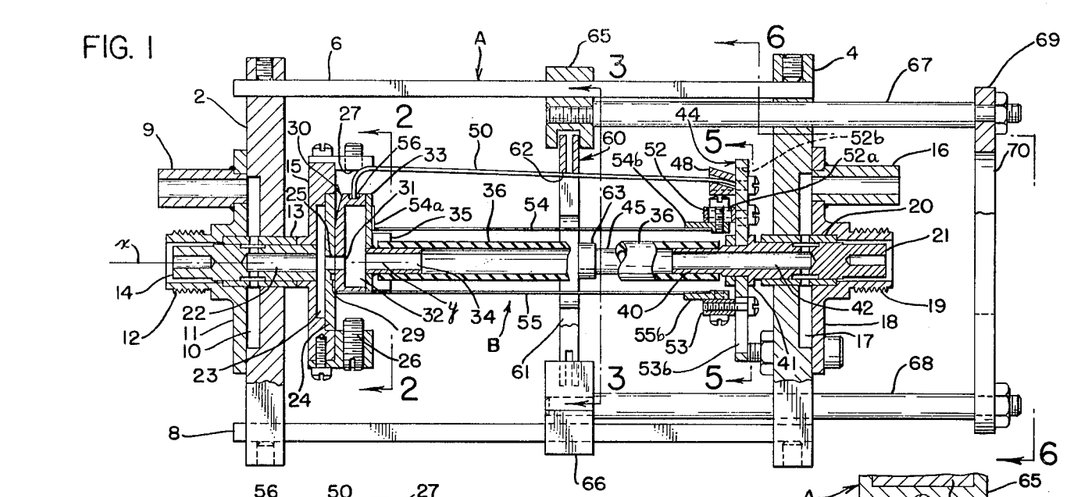
FIGURE 1 is a sectional side elevation disclosing one embodiment of the novel speed control mechanism.

Referring now to the drawings, wherein the showings are for the purpose of illustrating preferred embodiments of the invention and not for limiting same, FIGURE 1 discloses one embodiment of the novel speed control mechanism comprising a stationary frame A and a rotating pressure modulator B that is rotated in accordance with the speed of an engine driven vehicle. The speed control mechanism is used to modulate the pressure of a fluid which operates a servo-motor to vary the throttle setting of the vehicle engine. Basically, the stationary frame A comprises two spaced end plates 2, 4 that are secured in spaced relationship by tie rods 6, 8 which tie rods are adjustably secured within the end plates 2, 4 so that the distance between the end plates is adjustable. Referring now to end plate 2, there is provided within the end plate an inlet manifold 10 which is closed by a flanged cap 11. Motivating fluid having a pressure either above or below atmospheric is introduced into the manifold 10 through an inlet tube 9. To allow rotation of the pressure modulating structure B, end plate 2 is provided with a bearing sleeve 13 which extends into the flanged cap 11 to rotatably receive an input shaft 14 which is driven in accordance with the vehicle speed by a conventional motion transmitting device which is not disclosed. To impart rotation to the structure B, the input shaft 14 has its rearwardly extending end securely fastened to a base member 15 which really rotates about an axis substantially coinciding with its center of gravity.

Referring now to the second end plate 4, an outlet manifold 17 being closed by flanged cap 18 directs fluid having a modulated pressure from manifold 17 through an outlet tube 16. Thus the fluid operates a servo-motor which controls the throttle valve of the vehicle engine. This throttle controlling feature will be discussed in detail later in this specification. A bearing sleeve 20 is positioned within both the end plate 4 and the flanged cap 18 to rotatably receive an output shaft 21. Thus, the shafts 14 and 21 are journaled within the end plates 2, 4 to allow rotation of the modulating structure as a unit. External thread surfaces 12, 19 on the flanged caps facilitate connection of the driving devices to the rotating structure.

The bearing sleeves 13, 20 are suitably apertured to communicate the manifolds 10 and 17 with internal passages 22 and 42 of the rotating shafts 14 and 21. This allows communication of the fluid into and away from the rotating modulating structure B.

Fliud having a substantially unmodulated pressure is introduced into the rotating modulating structure B by inlet tube 9 and the fluid having modulated pressure is directed from the rotating modulating structure B by outlet tube 16. The modulating structure comprises basically a rotating radially fixed base member 15 and rotating radially displaceable valve member 30. The radially fixed base member 15 has an internal chamber 23 and face plate 24 provided with a port which may be in the form of a slot 25 which is substantially aligned with the rotational axis $x$. Unmodulated fluid from passage 22 enters chamber 23 and passes from the base member 15 through the port 25 provided in the face plate 24. Since the valve member 30 is radially displaceable, the base member 15 is provided with an inner adjustable stop 26 and an outer adjustable stop 27 to prevent excessive radial displacement of the valve member 30 in either direction. This is best shown in FIGURE 1. A vent port 29 extends transversely across face plate 24 for a purpose to be hereinafter described in detail.

The valve member has a surface close to, but spaced from, the surface of face plate 24 during its radially outward movement. A port which may be in the form of a slot 31 in the front surface of valve member 30 registers with port 25 to communicate the chamber 23 in base member 15 with a chamber 32 in valve member 30. The chamber 32 is closed by a plate 33 having a rearwardly extending tube 34 and adjustable weights 35 which weights may be stationary. The center of gravity of valve member 30 is offset from the axis $x$ about which the modulating structure B rotates. Thus, as the structure B rotates, the valve member 30 having a central axis $y$ which is initially aligned with axis $x$, shifts radially outwardly to restrict the communication between ports 25 and 31. Thus, as the speed of the structure B increases, the communication between the chambers 23 and 32 is limited. By this arrangement, the pressure of the fluid within chamber 32 is modulated according to the rotational speed of the structure B. The phrase "close to, but spaced from" indicates that the valve member and base member are spaced from each other at all times. It is contemplated to vary the spacing as desired so long as the minimum spacing does not allow the surfaces of the members to contact one another and the maximum spacing allows control between ports 25 and 31. The usual range of spacing is .001 to .025 inch and in the preferred embodiment a spacing of approximately .005 is used.

A flexible tube 36 connects tube 34 to a sleeve 40 which extends inwardly of the shaft 21. The flexible tube 36 allows movement of the valve member 30 and may be constructed in any suitable manner; however, it is found that a flexible rubber hose performs satisfactorily. In practice, the flexible tube 36 may consist of a metallic tube with a resilient bellows structure to allow radial movement of valve member 30.

The valve member 30 as it shifts radially with respect to face plate 24 must remain spaced from the face plate, for if there is contact between the face plate and the valve member 30, there will be substantial frictional forces developed to distract from the smooth operation of the modulating valve. As the rotational speed of valve member 30 increases, the valve member tends to shift radially outwardly with respect to the base member under the influence of centrifugal force. This centrifugal force is yieldingly opposed by a force tending to bias the valve member to its normal position with ports 25 and 31 aligned. This biasing force can be produced by a variety of means such as a coil spring mounted transversely of the valve member, one or more cantilever springs extending substantially parallel to the axis of rotation, or other resilient means such as air cushions mounted to yieldingly resist movement of the valve member. However, in the preferred embodiment a pair of cantilever springs is provided to furnish not only the resilient means, but also the supporting means to prevent contact of the valve member and base member.

Figure 4:
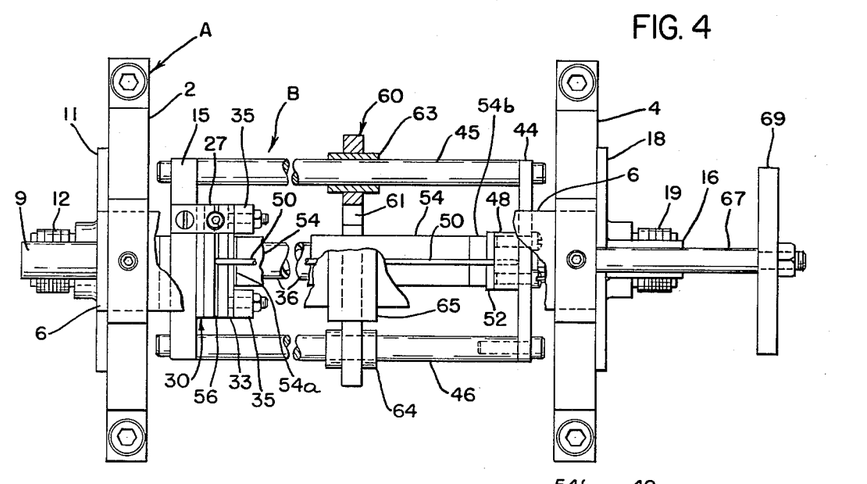
FIGURE 4 is a top view of the speed control mechanism shown in FIGURE 1.

In the preferred embodiment, the mounting means for the valve member 30 comprises a pair of cantilever control springs 54, 55 mounted at one end on a spring plate 44 which plate is affixed to shaft 21 in abutting relationship with a shoulder 41 provided on rearwardly extending sleeve 40. One cantilever control spring may be used instead of two control springs as shown in the present embodiment, however, it would then be necessary to contour the ported surfaces of face plate 24 and valve member 30 to maintain a slight spacing between these surfaces as the valve member shifts in an arcuate path. As is seen in FIGURE 4, the base member 15 is affixed to spring plate 44 by generally parallel drive shafts 45, 46 which forms the primary support for the structure B to thus allow the structure and its various component parts to rotate as a unit.

To allow adjustment of the speed setting of the modulating structure, an adjusting spring 50 extends from the spring plate 44 to the valve member 30. This adjusting spring operates with the control springs to determine the amount of centrifugal force required to displace the valve member a certain distance.

Figure 2:
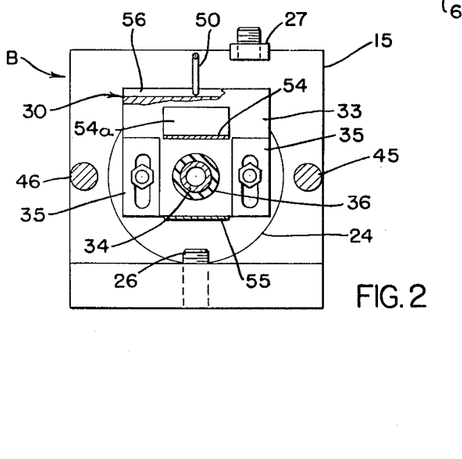
FIGURE 2 is a partial cross-sectional view taken along line 2—2 of FIGURE 1.
Figure 4A:
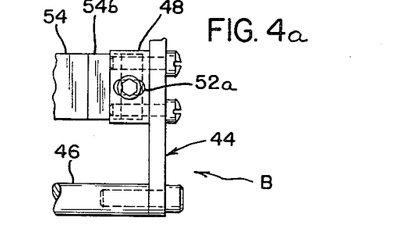
FIGURE 4a is a partial view disclosing the mounting arrangement for the control spring.

The inwardly facing surface of spring plate 44 receives an adjustable mounting lug 48 to secure the adjusting spring 50 onto the spring plate. Control spring 54 is joined through plate 54b to an adjustable mounting lug 52 which in turn has an elongated slot 52a to allow longitudinal adjustment of the spring 54. This adjusting feature is disclosed in FIGURE 4a. The forward end of the control spring 54 terminates in an angled portion 54a affixed at the rear of plate 33 to control the movement of the valve member 30. The control spring 55 is mounted on the spring plate 44 in the same manner as control spring 54 and the forward end of control spring 55 is secured to the under surface of the valve member 30 so the control springs are substantially parallel. Thus, the control springs form a parallelogram linkage system to guide the movement of the valve member 30 as it shifts radially with respect to the base member 15. The forward end of adjusting spring 50 has a depending finger received within a slot 56 on the upper surface of the valve member. This slot 56 is substantially wider than the diameter of the control spring 54 to allow engagement of the control spring with the valve member without causing interference with the spacing of the valve member from the face plate 24. To provide smoother contact between the valve member 30 and the adjusting spring 50, the lower end of the adjusting spring can be rounded to form a spherical tip as shown in FIGURE 2.

Figure 5:
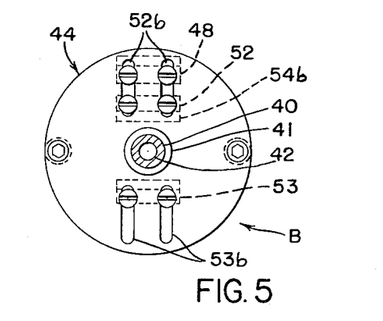
FIGURE 5 is a partial cross-sectional view taken along line 5—5 of FIGURE 1.

The springs 50, 54 and 55 are radially adjustable to give the proper movement of the valve member 30 with respect to the face plate 24 as shown in FIGURE 5 wherein upper radially extending parallel slots 52b provide for adjustment of mounting lugs 48 and 52 and lower parallel slots 53b provide for adjustment of mounting lug 53. It is, of course, realized that the various adjusting features disclosed may be eliminated or may be modified as long as they provide a substantial anchorage for the adjusting spring and control springs.

Figure 3:
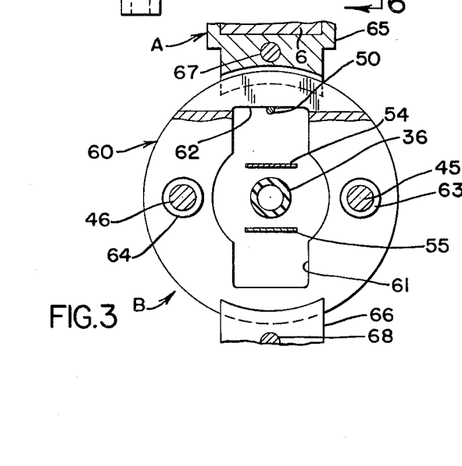
FIGURE 3 is a partial cross-sectional view taken along line 3—3 of FIGURE 1.
Figure 6:
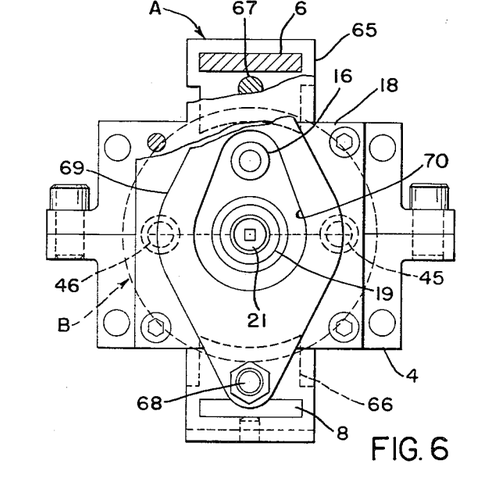
FIGURE 6 is a partial cross-sectional view taken along line 6—6 of FIGURE 1.

To adjust the controlled speed, a novel device is used to shift the fulcrum of spring 50. A fulcrum plate 60 which rotates with the modulating structure B is provided with openings 63, 64 surrounding drive shafts 45, 46 to hold the fulcrum plate onto the rotating structure B. The plate 60 has a central opening 61 which is symmetrical with respect to the center of rotation of the fulcrum plate so that no dynamic unbalance will result as the plate rotates. The fulcrum plate arrangement is best seen in FIGURE 3 showing a substantially flat surface 62 which contacts adjusting spring 50 so that longitudinal movement of the fulcrum plate 60 changes the force exerted by spring 50 on the upper portion of the valve member 30. The control springs 54, 55 and the flexible tube 36 pass through the opening 61; therefore, longitudinal movement of the fulcrum plate will not interfere with the action of the control springs. To move the fulcrum plate longitudinally along the adjusting spring 50, a pair of adjusting blocks 65, 66 are slidably received on the tie rods 6, 8 respectively. The inwardly extending ends of the adjusting blocks 65, 66 have a slot which receives the fulcrum plate 60 to allow movement of the plate as the adjusting blocks are moved along the tie rods. The fulcrum plate may rotate with respect to the adjusting blocks since there is no fixed connection between these members. Links 67, 68 extending from the adjusting blocks 65, 66 pass through end plate 4 and are secured to adjusting plate 69. Thus, reciprocal movement of the adjusting plate 69 causes movement of the adjusting blocks. The adjusting plate 69 may be appropriately apertured as at 70 in FIGURE 6 so outlet tube 16 and shaft 21 may be connected to their respective external members without interference from the adjusting plate 69.

In operation, the speed control mechanism is connected to a source of pressurized fluid so that the speed control mechanism will modulate the pressure of the fluid in accordance with the vehicle speed. The fluid, having a modulated pressure, then controls a servo-motor to operate the throttle valve of an engine so the speed of the vehicle is maintained substantially constant. The fluid enters inlet tube 9 and passes into chamber 23 through bearing sleeve 13 and passage 22. Then the fluid in chamber 23 passes outwardly through port 25 to the chamber 32 by way of port 31. Thus, the alignment of port 25 and port 31 provides direct communication between chambers 23 and 32. The fluid in chamber 32, which has a modulated pressure, passes through flexible tube 36 to the outlet tube 16. It is noted that since a vacuum source is preferred, the control fluid may actually flow from the outlet tube 16 toward the inlet tube 9; however, the description of the direction of flow of the pressurized fluid is not to be taken as a limitation of the invention. The direction of flow is only illustrative and may be varied according to the pressure of the control fluid source. The base member 15 and the valve member 30 rotate with the structure B in accordance with the vehicle road speed. Referring now to FIGURE 1, base member 15 rotates about axis $x$ which passes through the port 25. The axis $y$ of the radially displaceable valve member 30 passes through port 31 and is substantially aligned with the axis $x$ during relatively low rotational speed of the structure B. Since the center of gravity of the valve head 30 is offset from axis $x$, as the speed of the structure B increases, axis $y$ of valve member 30 is shifted outwardly with respect to axis $x$. This outward movement is against the resilient forces of springs 50, 54 and 55. As the axes $x$ and $y$ are displaced, the communication between chambers 23 and 32 is correspondingly restricted. Thus, the pressure in chamber 32 is varied to cause a corresponding change in the throttle setting of the engine. It is of considerable importance that the valve member 30, as it moves radially with respect to the face plate 24, does not contact the face plate 24. Thus, the relative movement between ports 25 and 31 is friction-free. If there were contact between valve member 30 and face plate 24, it would be necessary to build up a certain amount of force to overcome the static friction between the contacting members. This build up of force causes an abrupt movement between the members and results in an erroneous modulation between the chambers 23 and 32 to seriously limit the function of the speed control mechanism.

As the valve member 30 moves radially with respect to the face plate 24, there should be no contact; however, these members should be very close together to limit the pressure leak between the two members. Thus, it is desired to provide substantially parallel movement between the valve member 30 and the face plate 24. To accomplish this, various arrangements may be used; but in the embodiment shown a pair of control springs 54, 55 are secured to the spring plate 44 and the valve member 30 to form a parallelogram linkage. Thus, the radial movement of the valve member 30 against the resiliency of the control springs 54, 55 is substantially parallel to the surface of the face plate 24. To align the ports 25 and 31 and to impart the proper movement of valve member 30 with respect to face plate 24, the control springs are adjustably mounted onto the spring plate 44. The radial movement of the valve member 30 is limited by the adjustable stop 26 and 27. A swingable, non-extensible link or arm could be used to support the valve member close to, but spaced from, the face plate; however, in such a structure the mating surfaces should be contoured and an auxiliary spring means must be used to bias the valve member into the normal position. By supporting the valve member as in the preferred embodiment or as in the mentioned alternative structure, the valve member does not move axially. The force of the pressure fluid on the valve member is axial and acts against the supports for the valve member so that it in no way affects the radial force on the valve member. For this reason, variations in the unmodulated fluid pressure do not change the operational characteristics of the valve.

To change the speed setting of the speed control mechanism, the adjusting plate 69 is reciprocated longitudinally to change the position of adjusting blocks 65, 66. This action shifts the location of fulcrum plate 60 and changes the resilient characteristics of adjusting spring 59 which acts upon the upper surface of valve member 30 to adjust the speed setting of the mechanism.

Means are provided for venting the servo-motor to atmosphere when the vehicle is at rest or when the vehicle is moving at a speed substantially below the set speed of the governor to thereby deactivate the servo-motor. This means prevents over-speeding of the vehicle if the governor is in operation and the engine is disconnected from the rear wheels. Many structural embodiments may be used; however, in the preferred embodiment the vent port 29 in the outer surface of face plate 24 is arranged to communicate with slot 31 to vent chamber 32 to the atmosphere when the speed of the rotating structure B is below the speed of the governor. This causes control of the vehicle only above a set value at which time the vent port 29 is out of communication with the slot 31.

Figure 7:
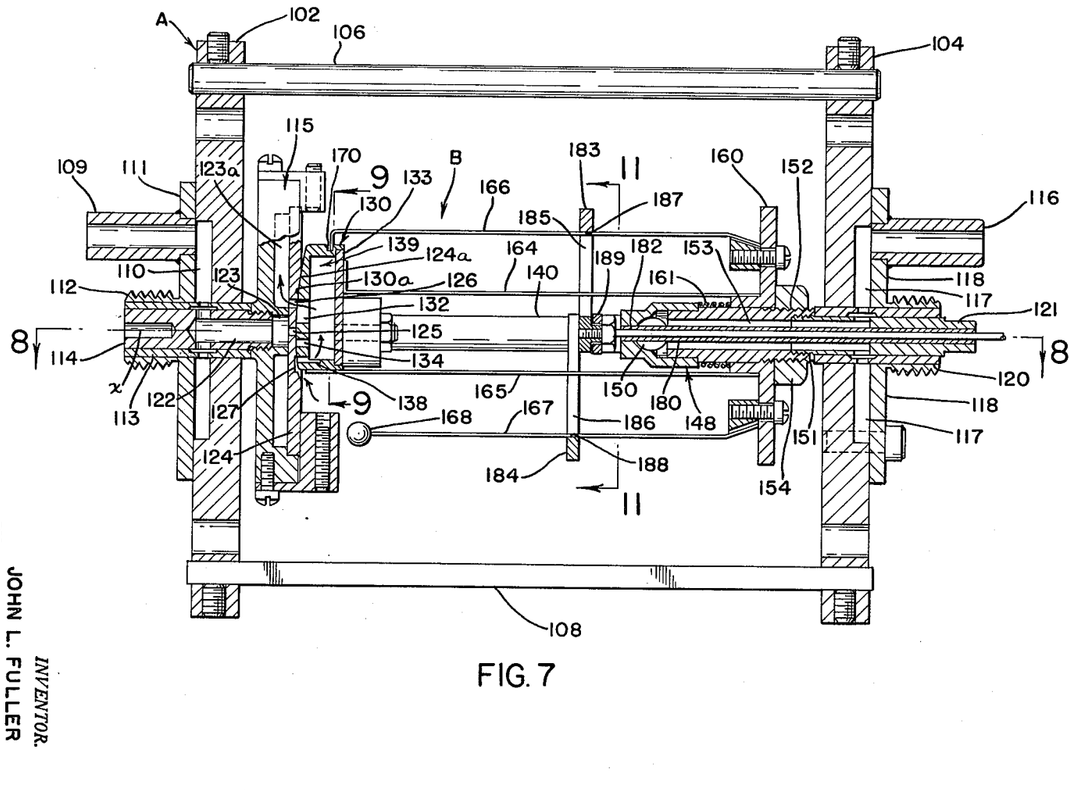
FIGURE 7 is a cross-sectional side elevation showing a second embodiment of the novel speed control mechanism.
Figure 8:
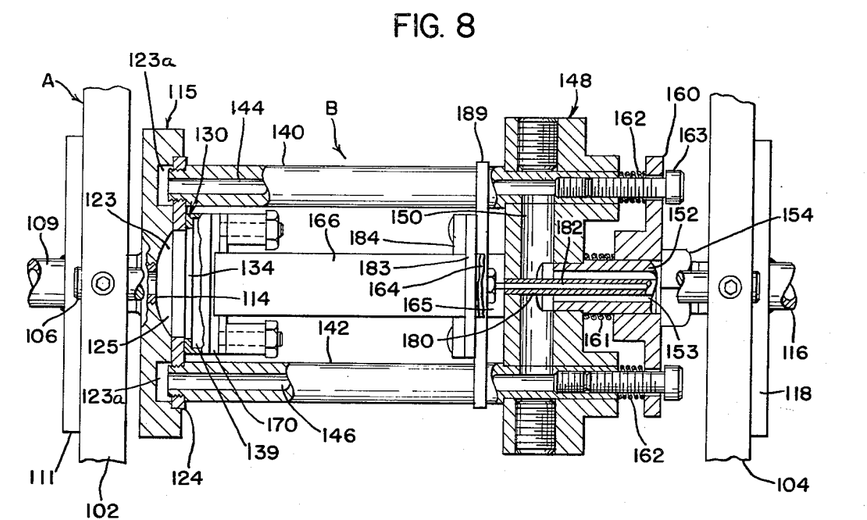
FIGURE 8 is a partial cross-sectional view taken along line 8—8 of FIGURE 7.

Referring now to FIGURE 7, a modification of the invention is disclosed wherein the stationary frame A comprises spaced end plates 102, 104 secured together by tie rods 106, 108 and having manifolds 110, 117 covered by flanged caps 111, 118 provided with an inlet tube 109 and an outlet tube 116. This arrangement is basically the same as it is found in the previously discussed embodiment of the invention. Fluid having unmodulated pressure enters inlet tube 109 and passes through a bearing sleeve 113 to a chamber 123 centrally located within a base member 115 as is shown in FIGURE 8. The base member 115 rotates about axis $x$ and is driven by an input shaft 114. A second chamber 123a is provided within the base member 115 and the two chambers within the base member are closed by a face plate 124 which has a slot 125 opening into chamber 123 and a slot 126 opening into chamber 123a. The chambers 123 and 123a are not in direct communication with each other. The outer surface of face plate 124 has an external contoured surface 124a and a transversely extending vent slot 127.

Figure 9:
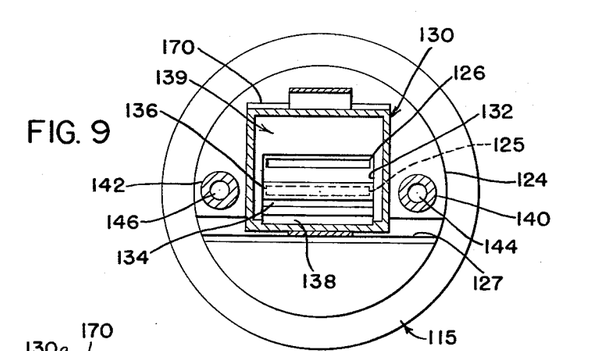
FIGURE 9 is a cross-sectional view taken along line 9—9 of FIGURE 7.

To control the communication between chamber 123 and chamber 123a so that fluid in the latter chamber has a modulated pressure, a valve member 130 moves radially with respect to the face plate 124 in close relationship to the external surface 124a without actually coming into contact with this surface. The outer surface of the valve member 130 has a contoured surface 130a which substantially matches the external contoured surface 124a of face plate 124. The valve member 130 has a relatively wide port 132 adapted to continuously communicate a chamber 139 within the valve member 130 with the chamber 123a of the base member 115. According to the radial position of the valve member, the chamber 139 is either connected to chamber 123 by a narrow port 134 or to atmosphere through a vent port 138 in the valve head and vent slot 127 on the external surface 124a. On over-speed, the clearance between the base and valve member vents chamber 139 to atmosphere through slot 132. The ports 132 and 134 are separated by an intermediate area 136 that blocks off the port 125 until the valve member 130 has moved outwardly a given radial distance with respect to the face plate 124, at which time the port 125 registers with port 134 to communicate chamber 123 with chamber 139. The radially outward movement of the valve member 130 also closes the vent port 138 after a given movement of the valve member. This arrangement of the valving ports is disclosed in detail in FIGURE 9. The length of ports may be varied according to the amount of fluid passage needed to operate the throttle valve servo-motor.

It is realized that if a vacuum is used to operate the speed control mechanism, the air will actually flow from the outlet tube 116 to the inlet tube 109; however, for simplicity, the speed control mechanism is being discussed as if the operating fluid has a pressure above atmospheric. The same modulating principle is present when vacuum from an engine manifold is used. To further define the fluid path, the chamber 123a is communicated to a passage 150 by way of central openings 144, 146 in a pair of drive shafts 140, 142. Passage 150 is located within a support rod block 148 and is communicated through passage 153 in sleeve 152 on extension 151 of an output shaft 121 to the outlet tube 116.

Slidably received on the outer surface of sleeve 152 is a spring plate 160 that supports adjusting spring 166, control springs 164, 165 and counterweight spring 167. The control springs 164, 165 are secured to parallel flat surfaces on the spring plate which arrangement is slightly different than the means for attaching the control springs in the previously discussed embodiment. Spring plate 160 is urged against a pair of adjusting screws 163 by a central compression spring 161 and a pair of spaced compression springs 162. Thus, valve member 130 may be adjusted with respect to surface 124a by the screws 163 or by nut 154. As in the other embodiment of this invention, the control springs 164, 165 control the movement and provide the resilient mounting for valve member 130 which, of course, has its center of gravity offset from axis $x$.

Figure 11:
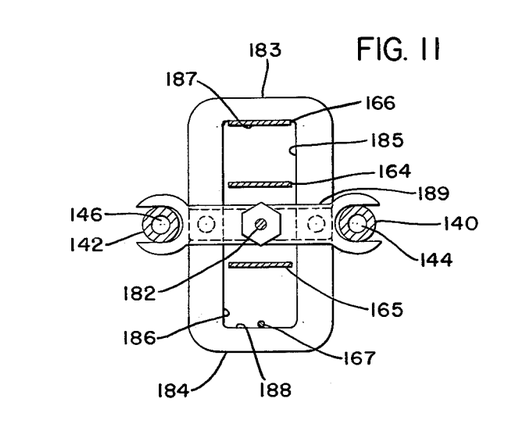
FIGURE 11 is a cross-sectional view along line 11—11 of FIGURE 7.

To vary the speed setting of the control mechanism, the adjusting spring 166 has a formed portion that engages a slot 170 on the upper surface of the valve member 130. The width of the slot is greater than the thickness of spring 166 so that the adjusting spring will not interfere with alignment of valve member 130 with respect to surface 123a as it shifts radially with variations in the ground speed of the vehicle. Fulcrum plates 183, 184 secured to an adjusting plate 189 have central openings 185, 186 with flat fulcrum surfaces 187, 188. In FIGURE 11, the control springs pass through these central openings. Adjusting spring 166 abuts surface 187 to provide a changeable fulcrum for adjusting spring 166 which varies the speed setting as the plate 183 is reciprocated longitudinally. Lower flat surface 188 contacts counterweight spring 167 in much the same manner. A bearing sleeve 180 journals a control rod 182 which manually reciprocates the adjusting plate 189 along drive shafts 140, 142. In this embodiment of the speed control mechanism, a counterweight 168 is attached to spring 167 in order to obtain dynamic balance of the rotating parts.

In operation, this modification of the speed control mechanism functions quite similarly to the embodiment of FIGURES 1–6. There are some important differences, especially in the valving between the valve base and the valve head and in the speed setting arrangement.

Referring again to FIGURE 7, the speed control mechanism is shown in the position assumed when the vehicle is not moving. Means are provided to vent the servo-motor to atmosphere and in the embodiment the chamber 123a, which usually has fluid of a modulated pressure, is vented to the atmosphere through ports 126, 132 and 138 and groove 127 as is indicated by the arrow. Thus, there is no pressure exerted upon the throttle controlling servo-motor. Until the speed control mechanism is activated by a valve as discussed later, no pressure is introduced through tube 109. Upon activation of the control mechanism, pressure preferably vacuum from the engine intake manifold, is introduced through the tube 109 and into chamber 123. However, the pressure cannot be communicated with chamber 139 because the port 125 is closed by intermediate area 136. As the vehicle speed increases, assuming that the control mechanism is activated and chamber 123 is pressurized, the valve member 130 moves radially outwardly by centrifugal force to close the atmospheric vent and open port 125. Thus pressure is communicated to chamber 139. The atmospheric vent defined by port 138 prevents this pressure from being directed into chamber 123a until port 125 and port 134 are substantially aligned to direct a pressurized fluid into chamber 139. With the ports 125 and 134 aligned, the maximum pressure is transmitted through the ports to open the throttle valve and the speed control mechanism assumes control of the vehicle engine. This is a safety feature because without the atmospheric venting ports and the blocking area 136 the control mechanism could take over operation of the engine before such control is desirable. If the speed control mechanism were turned on while the vehicle is stopped and the transmission is in neutral, the control mechanism would speed up the engine in an attempt to bring the vehicle to the speed to which the control mechanism is adjusted, which would result in over speeding the engine. If the vehicle were in gear, the speed control mechanism would inadvertently start and accelerate the vehicle.

Figure 10:
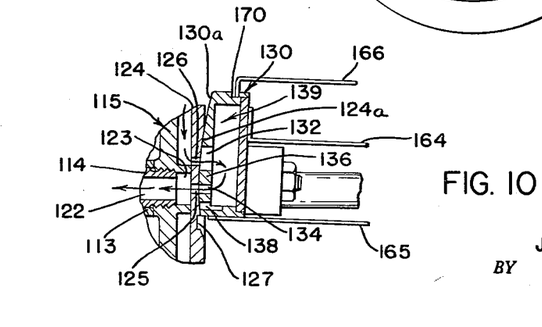
FIGURE 10 is a cross-sectional view showing the modulating valve in the control position.

In FIGURE 10, the control mechanism is exerting a maximum force to open the throttle. As the vehicle speed increases, the valve member 130 moves radially outwardly to restrict communication between ports 125 and 134. As the communication of these ports is restricted, the pressure within the chamber 123a is varied and the servo-motor tends to close the engine throttle. According to the setting of the fulcrum plate 183, an equilibrium is reached whereby the vehicle speed is maintained constant.

Figure 12:
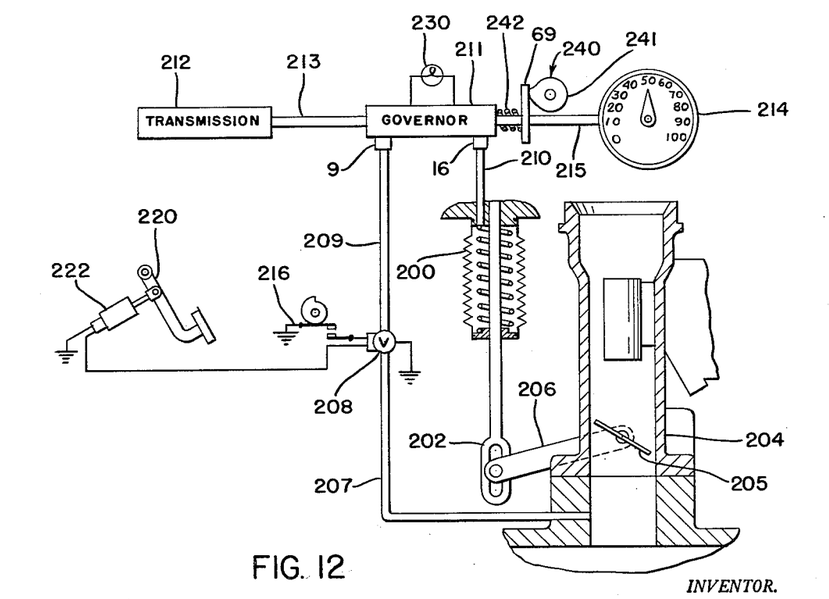
FIGURE 12 is a diagrammatical view of the speed control mechanism as it is incorporated within a vehicle.

FIGURE 12 shows the use of the speed control mechanism and its relation to various components within the vehicle. A servo-motor 200, the function of which has been previously mentioned, controls the movement of depending lost motion link 202 which engages pivotal control link 206. The servo-motor may be vented to give an improved response to variations in pressure. Control link 206 operates a butterfly valve 205 within an engine carburetor 204 by a suitable connection not shown in detail. When the servo-motor is in its normal position, the link 202 is fully extended and the butterfly valve 205 may be manually operated without interference by the control link 202. When pressurized fluid, i.e., vacuum, is introduced into the servo-motor 200, the link 202 is pulled upwardly against a control means such as a spring to open the butterfly valve in accordance with the modulated pressure of the fluid within the servo-motor. The control link 206 is preferably biased into a valve closed position so that it follows the movement of the link 202. A vacuum line 207 is communicated to the intake manifold of the engine and terminates at a control valve 208. This valve 208 introduces vacuum into line 209 connected to inlet tube 9 of the speed control mechanism 211. The outlet tube 16 is connected by a line 210 to direct fluid at a modulated pressure from the speed control mechanism to the servo-motor 200. The speed control mechanism is driven at a speed proportional to the vehicle speed by a line 213 from transmission 212. A power takeoff from the speed control mechanism may be used to operate a device such as a speedometer 214. The valve 208 is operated by a manually controlled device 216 which is schematically shown as a cam and electrical contacts, however, any mechanical, electrical, hydraulic or pneumatic device may be used to open and close the valve 208. When the valve 208 is opened and the speed of the vehicle is above a certain value, the speed control mechanism 221 cuts in to maintain the vehicle speed substantially constant.

When the brakes of the vehicle are applied, it is no longer advantageous to control the speed of the vehicle. Thus, the valve 208 may be closed by a means 222 which is shown as a hydraulically operated electrical switch; however, any suitable arrangement may be used. As the brake is depressed, the valve 208 is disconnected and the butterfly valve is then controlled manually.

A variety of manually operated arrangements may be used to longitudinally position adjusting plate 69 to vary the speed setting of the control mechanism. One of such arrangements 240 comprises a manually operated cam 241 and a spring 232 which maintains the adjusting plate 69 in contact with the cam. Of course, a wide variety of devices may be used.

Even if the speed control mechanism is not turned on by opening valve 208, it is possible to use the flyweight arrangement within the control mechanism to close a pair of contacts which would light a signal 230. Of course, the contacts must be insulated so that they are electrically connected only when speed reaches a predetermined value. The signal 230 may be an electrically energized audible device such as a bell or a buzzer or a visual device such as a lamp.

The present invention has been described in conjunction with two structural embodiments, but the scope of the invention is not to be limited thereby. The invention may take a variety of structural embodiments without departing from the scope and spirit of the depending claims.

What is claimed as new is:

1. In a speed control mechanism for controlling the speed of a vehicle having a throttle controlled driving engine comprising a source of pressurized fluid, a fluid operated throttle control device, and a pressure modulating means responsive to the speed of a vehicle to modulate the pressure of the fluid as it passes from the fluid source to the throttle control device to control the throttle setting according to the speed of the vehicle, the improvement comprising: said pressure modulating means comprising a radially fixed base member connected to said fluid source and having a first control port, and a valve member movably mounted on a frame rotatable about an axis at a speed proportional to the vehicle speed and said valve member having a second control port and an outlet passage, means connecting said outlet passage of said valve member to said throttle control device, said valve member having a center of gravity offset from said axis, resilient means connecting said valve member to said frame so said valve member is radially displaced against the resiliency of said resilient means in accordance with the vehicle speed, said first control port substantially aligned with said second control port when the rotational speed of said valve member is at a first speed and said first control port and said second control port being shifted radially from alignment as said valve member shifts radially in accordance with the vehicle speed and support means to maintain said valve member and said base member in close spaced relationship at all times, said resilient support means comprising a cantilever spring having a radially fixed end connected to said frame and a radially movable end connected to said valve member so that the centrifugal force exerted on said spring by the valve member as the speed of said vehicle incresaes causes said movable end to move radially outwardly a distance corresponding to the speed of the vehicle.

2. A speed responsive pressure modulating valve adapted for use in a speed control mechanism for a vehicle driven by a throttle controlled engine, said valve comprising a frame rotatable about an axis at a speed proportional to the speed of the vehicle, a base member mounted on said frame and having a first and a second chamber, said first chamber connected to a source of fluid having unmodulated pressure and said second chamber connected to a control device for said throttle, said base member having an external surface, a first port connected to said first chamber and a second port conected to said second chamber, said first and second ports extending through said external surface, a vent groove in said external surface, a valve member mounted on said frame and having an intermediate chamber with a larger outlet port, a smaller inlet port, an intermediate area between said larger and said smaller ports, and a vent port, said base member and said valve member rotating with said frame, said valve member having a center of gravity offset from the axis of rotation of said frame and a resilient means which allows the valve member radial displacement with respect to said base member in response to changes in the rotational speed of said frame, said larger port opposite said second port to communicate said second chamber with said intermediate chamber at all times, said intermediate area closing said first port while said vehicle speed is below a predetermined value, when said vehicle speed is below this predetermined value, the external surface of said base member closes said smaller port and said vent port communicates with said groove to vent the intermediate chamber to atmosphere, at a vehicle speed above this predetermined value, said smaller port coacts with said first port to modulate the pressure of the gas in said second chamber in accordance with the radial displacement of said valve member and said vent port is closed by said external surface of said base member, and a support means to maintain said valve member close to but spaced from the external surface of said base member during radial displacement of said valve member.

3. In a speed control mechanism for controlling the speed of a vehicle having a throttle controlled driving engine comprising a source of fluid having unmodulated pressure, a fluid operated control device for changing the setting of the throttle in response to a modulated fluid pressure, and a vehicle speed responsive modulating means between said source and said control device, the improvement comprising: a first stationary frame and a second frame said second frame journaled within said first frame and rotatable about an axis, said first frame comprising a first end plate and a second end plate, each of said end plates having an inner fluid chamber, means communicating the inner chamber of the first end plate to said source and means communicating the inner chamber of said second end plate to said fluid control device, a base member mounted on said second frame and having a passage communicated to the inner chamber of said first end plate, a spring plate mounted on said second frame and having a passage communicated to the inner chamber of said second end plate, said spring plate and said base member secured in fixed, spaced relationship to each other by at least one drive shaft, a valve member having a center of gravity offset from the axis of rotation of said second frame and rotatable with said second frame, spring means joining said valve member to said spring plate so said valve member moves radially outwardly as the speed of said second frame increases, support means to maintain said valve member close to, but spaced from, said base member, means communicating said valve member to said inner chamber of said second end plate, a control port in said base member and a control port in said valve member, said control ports lying on said axis of rotation and being substantially aligned at relatively low speeds to move said throttle toward an open position and said control ports being shifted from alignment as said valve member moves radially in response to an increase of the rotational speeds of said second frame to move said throttle toward a closed position.

4. The improvement as defined in claim 3 wherein said means communicating said valve member to said inner chamber of said second end plate comprises a flexible tube extending from said valve member to said passage in said spring plate.

5. The improvement as defined in claim 3 wherein said means communicating said valve member to said inner chamber of said second end plate comprises a port in said valve member in substantially continuous alignment with an inlet port in said base member, said inlet port connected to an intermediate passage in said base member, and a passage through said drive shaft from said intermediate passage to said passage in said spring plate.

6. A speed sensitive valve adapted to control the pressure of fluid to a servo-motor, said valve comprising a base member and a valve member, said valve member being rotatable about an axis and having a center of gravity offset from said axis, each of said members having a large area surface substantially perpendicular to said axis and slightly spaced from each other, said surfaces movable with respect to each other in a direction perpendicular to said axis, each of the surfaces having a control port adapted to shift into and out of alignment as the valve member rotates and is moved radially by centrifugal force, means for maintaining said surfaces in close, spaced relationship as they move with respect to each other a resilient means yieldably opposing said radial movement, and a first means to vent the servo-motor to atmosphere when said centrifugal force is below a predetermined value, and a second means to close said first means when said centrifugal force equals said value.

7. In a speed control mechanism for controlling the speed of a vehicle having a throttle controlled driving engine comprising a source of pressurized fluid, a fluid operated throttle control device, and a pressure modulating means responsive to the speed of a vehicle to modulate the pressure of the fluid as it passes from the fluid source to the throttle control device to control the throttle setting according to the speed of the vehicle, the improvement comprising: said pressure modulating means comprising a radially fixed base member connected to said fluid source and having a first control port, and a valve member movably mounted on a frame rotatable about an axis at a speed proportional to the vehicle speed and said valve member having a second control port and an outlet passage, means connecting said outlet passage of said valve member to said throttle control device, said valve member having a center of gravity offset from said axis, resilient means connecting said valve member to said frame so said valve member is radially displaced against the resiliency of said resilient means in accordance with the vehicle speed, said first control port substantially aligned with said second control port when the rotational speed of said valve member is at a first speed and said first control port and said second control port being shifted radially from alignment as said valve member shifts radially in accordance with the vehicle speed and support means to maintain said valve member and said base member close to but spaced from each other at all times, said support means comprising a pair of substantially parallel links having first ends connected to said valve member at spaced points and having second ends connected to said frame on opposite sides of the rotational axis of said frame.

8. The improvement as defined in claim 7 having means for adjusting the resiliency of said resilient means to change the amount of radial displacement of said valve member for any given vehicle speed, said adjusting means comprises an adjusting spring having a radially fixed end connected to said frame remote from said valve member and a radially movable end connected to said valve member and a movable fulcrum, said movable fulcrum contacting said spring between its ends to determine the effect of said adjusting spring on the radial movement of said valve member.

9. In a speed control mechanism comprising a first valve member and a second valve member, each of said valve members being rotatable about an axis, said second valve member having a center of gravity offset from said axis whereby rotation of said members about said axis causes said members to shift with respect to each other in a direction transverse to said axis, resilient means to control the transverse displacement of said members for a given speed, means for adjusting the resiliency of said resilient means to change the rate of transverse displacement of said members, the improvement comprising: said adjusting means including an adjusting spring having an end radially fixed with respect to said first valve member remote from said second valve member, said spring having a radially movable end connected to said second valve member and a movable fulcrum, said fulcrum contacting said spring between its ends to determine the effect of said adjusting spring on the radial displacement of said valve members.

10. In a speed control mechanism comprising a first valve member and a second valve member, each of said valve members being rotatable about an axis, said second valve member having a center of gravity offset from said axis whereby rotation of said members about said axis causes said members to shift with respect to each other in a direction transverse to said axis, resilient means to control the transverse displacement of said members for a given speed, means for adjusting the resiliency of said resilient means to change the rate of transverse displacement of said members, the improvement comprising: said adjusting means including an adjusting spring having an end radially fixed with respect to said first valve member remote from said second valve member, said spring having a radially movable end adapted to contact said second valve member and move said valve member radially inward and a movable fulcrum, said fulcrum contacting said spring between its ends to determine the effect of said adjusting spring on the radial displacement of said valve members.

11. In a speed control mechanism comprising a first valve member and a second valve member, each of said valve members being rotatable about an axis, said second valve member having a center of gravity offset from said axis whereby rotation of said members about said axis causes said members to shift with respect to each other in a direction transverse to said axis, resilient means to control the transverse displacement of said members for a given speed, means for adjusting the resiliency of said resilient means to change the rate of transverse displacement of said members, the improvement comprising: said resilient means including an adjustable spring having an end radially fixed with respect to said first valve member remote from said second valve member, said spring having a radially movable end arranged to bias said second valve member radially inward, and said adjusting means including a movable fulcrum, said fulcrum contacting said spring between its ends to determine the effect of said spring on the radial displacement of said valve members.

12. A speed control mechanism for controlling the flow of fluid in a line in response to the speed of a rotating shaft comprising a fixed frame, a second frame rotatably journaled with respect to said fixed frame and arranged to be rotated in timed relationship with the speed of said rotating shaft, a first valve member on said second frame, a second valve member shiftably mounted on said second frame, unbalanced mass means mounted for rotation with said second frame arranged to shift said second valve member with respect to said first valve member responsive to the centrifugal force produced by rotation of said second frame, valving means carried on said first and second valve members adapted to control the flow of fluid through said line responsive to the relative position of said valve members, spring means carried on said second frame arranged to produce a biasing force in opposition to the centrifugal force produced by said unbalanced mass means, adjusting means movable to vary the biasing force of said spring means, and control means for moving said adjusting means during rotation of said second frame and including a non-rotatable member and bearing means coaxial with the axis of rotation of said second frame interconnecting said non-rotatable member and said adjusting means.

13. A speed control mechanism for controlling the flow of fluid in a line in response to the speed of a rotating shaft comprising a fixed frame, a second frame mounted to rotate with respect to said fixed frame and in timed relationship with the speed of said rotating shaft, a first valve member on said second frame, a second valve member shiftably mounted on said second frame, unbalanced mass means mounted for rotation with said second frame and arranged to shift said second valve member with respect to said first valve member responsive to the centrifugal force produced by rotation of said unbalanced mass means by said second frame, valving means carried on said first and second valve members for controlling the flow of fluid through said line responsive to the relative position of said valve members, spring means carried on said second frame and arranged to produce a biasing force in opposition to the centrifugal force produced by said rotating unbalanced mass means, and adjusting means for adjusting the biasing force of said spring means, said adjusting means including an adjusting member movable along the axis of rotation of said second frame and rotatable therewith, said adjusting member coacting with said spring means to change the biasing force of said spring means in accordance with the axial position of said adjusting member, and a movable member on said fixed frame for adjusting the axial position of said adjusting member while it is rotating.

14. A speed control as defined in claim 13 wherein said spring means is a spring extending axially of said second frame and said adjusting member is a fulcrum movable axially along said spring.

15. A speed control as defined in claim 14 wherein said movable member has a bearing surface engaging said rotating adjusting member and including means for moving said movable member in a direction axial of said second frame.

References Cited by the Examiner

UNITED STATES PATENTS

| 1,550,567 | 8/25 | Oliver | 137—56 X |
| 2,081,466 | 5/37 | Tarisien | 137—56 |
| 2,779,582 | 1/57 | Hopper et al. | 137—56 X |
| 2,935,076 | 5/60 | Larges et al. | 137—56 |
| 3,023,761 | 3/62 | Greenlees | 137—56 |

FOREIGN PATENTS

| 803,629 | 4/51 | Germany. |
| 909,655 | 4/54 | Germany. |

OTHER REFERENCES

Akt. G. Kuhnle, Kopp and Kausch (Germany) K 15, 677, Feb. 9, 1956.

A. HARRY LEVY, *Primary Examiner.*